United States Patent [19]

Niwa

[11] Patent Number: 4,457,053
[45] Date of Patent: Jul. 3, 1984

[54] CABLE CLAMP

[76] Inventor: Katsumi Niwa, 874-2, Nakagiri, Mitake-cho, Kani-gun, Gifu-ken, Japan

[21] Appl. No.: 408,934

[22] Filed: Aug. 17, 1982

[51] Int. Cl.³ .................. A44B 21/00; F16L 3/08
[52] U.S. Cl. .................. 24/304; 24/DIG. 11; 248/74.1; 248/205.3
[58] Field of Search .................. 24/304, DIG. 11, 5, 24/6, 305, 115 A, 129 W; 248/74 R, 74 B, 205 A; 174/174, 175

[56] References Cited

U.S. PATENT DOCUMENTS

| | | | |
|---|---|---|---|
| 2,366,041 | 12/1944 | Morehouse | 248/74 B |
| 2,431,379 | 11/1947 | Ellinwood | 248/74 B |
| 2,637,084 | 5/1953 | Lorentzen | 24/129 W |
| 2,884,478 | 4/1959 | Becker et al. | 24/129 W |
| 3,097,079 | 7/1963 | Todd et al. | 24/5 |
| 3,409,257 | 11/1968 | Elm | 248/205 A |
| 3,542,321 | 11/1970 | Kahabka | 24/DIG. 11 |
| 3,659,319 | 5/1972 | Erickson | 24/304 |
| 3,913,876 | 10/1975 | McSherry | 248/205 A |
| 4,165,561 | 8/1979 | Miller et al. | 433/9 |

FOREIGN PATENT DOCUMENTS

| | | | |
|---|---|---|---|
| 1508235 | 1/1968 | France | 248/74 R |
| 448202 | 3/1968 | Switzerland | 248/74 R |

Primary Examiner—John J. Wilson
Attorney, Agent, or Firm—Oblon, Fisher, Spivak, McClelland & Maier

[57] ABSTRACT

A cable clamp comprises a clamp body provided with an adhesive layer and a peeling layer to cover the adhesive layer a lower surface and with a cushion member applied to an upper surface, and a pressure element which projects from a side surface of the clamp body and has a cushion member applied to a lower surface, wherein the clamp body and the pressure element are formed integrally by thin metal sheets, thereby cables in any shape can be clamped without damaging insulation portion thereof.

14 Claims, 11 Drawing Figures

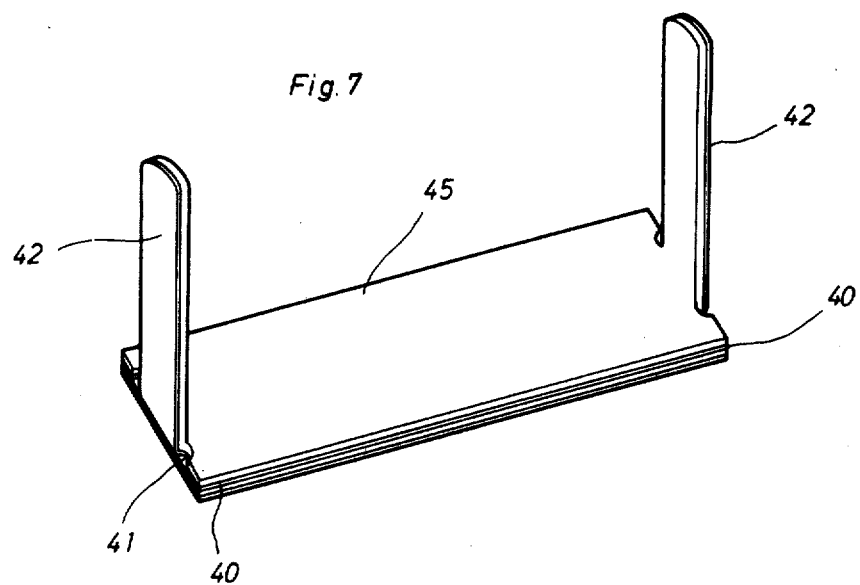
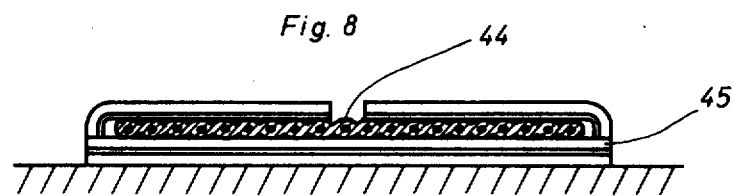
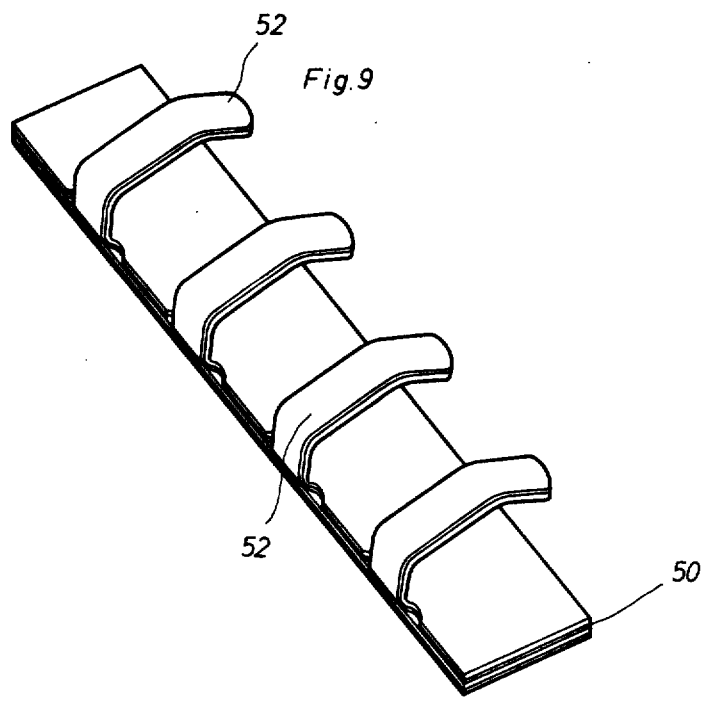

CABLE CLAMP

BACKGROUND OF THE INVENTION (1) Field of the Invention

The present invention relates to clamps of cables used for electric wiring.

(2) Description of the Prior Art

Various sorts of cable clamps have been worked out conventionally to fix cables to a base during electric wiring. However, conventional cable clamps have disadvantages in that cables are liable to damage, an attaching hole must be formed on a base in order to attach a cable clamp to the base, and use is significantly restricted depending on thickness and shape of the cables.

SUMMARY OF THE INVENTION

An object of the present invention is to provide a cable clamp wherein cables are fixed stably without damage, and the cable clamp can be used in any base and for cables having any thickness or shape.

Such an object can be attained by a cable clamp of the present invention comprising a clamp body provided with an adhesive layer and a peeling layer to cover the adhesive layer at a lower surface and with a cushion member applied to an upper surface, and a pressure element projecting from a side surface of the clamp body and having a cushion member applied to a lower surface, wherein the clamp body and the pressure element are formed integrally by thin metal sheets.

BRIEF DESCRIPTION OF THE DRAWINGS

FIG. 7 is a perspective view of a fourth embodiment of the invention;

FIG. 8 is a sectional view illustrating a use state of the fourth embodiment;

FIG. 9 is a perspective view of a fifth embodiment of the invention;

DESCRIPTION OF THE PREFERRED EMBODIMENTS

Figure 1:
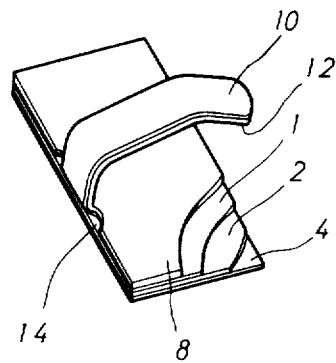
FIG. 1 is a perspective view, partly broken, illustrating a first embodiment of the present invention.

FIG. 1 shows a cable clamp as a first embodiment of the invention. In this embodiment, a rectangular planar clamp body 1 has an adhesive layer 2 at its lower surface, a peeling layer 4 of paper or plastics disposed at a lower side of the adhesive layer 2 so as to cover the layer 2, and a cushion member 8 such as felt, cloth, non-woven cloth, polyvinyl chloride form, polyurethane form or polyethylene form applied to the upper surface of the clamp body 1. The adhesive layer 2 may be formed by coating an adhesive agent or applying a double-layer adhesive tape. A pressure element 10 projects upwards from the side surface of the clamp body 1 and is bent laterally, and a cushion member 12 of similar material to that of previously mentioned cushion member 8 is applied to the lower surface of the pressure element 10. The clamp body 1 and the pressure element 10 are made of thin plastically deformable metal such as mild steel, aluminum or brass, and both are formed integrally. Notches 14 are formed on the clamp body 1 near root portions at both sides of the pressure element 10 projecting from the clamp body 1 so as to facilitate the bending of the pressure element 10.

Figure 2:
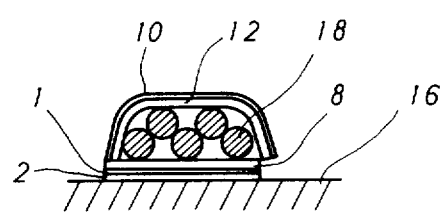
FIG. 2 and FIG. 3 are sectional views illustrating a use state of the first embodiment.
Figure 3:
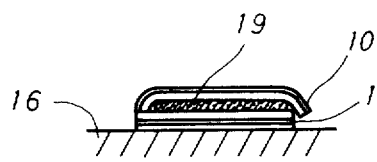

When a cable clamp as constituted in the first embodiment is used, the peeling layer 4 is removed and the clamp body 1 is pressed on a required portion of a base 16 so that the cable clamp is attached to the base 16 by means of the adhesive layer 2. If cables are inserted between the clamp body 1 and the pressure element 10 and then the pressure element 10 is pressed towards the clamp body 1, the pressure element 10 is deformed and held in the deformed state since it is made of thin metal, thereby the cables 18 are fixed as shown in FIG. 2. Since the cables 18 are directly contacted with only the cushion members 8, 12 in this constitution, damage of the cables does not occur. Since the pressure element 10 is deformed into any configuration, cables 18 may be fixed whether they are single or plural. Furthermore, a flat-cable 19 in flat configuration may be fixed as shown in FIG. 3.

Figure 4:
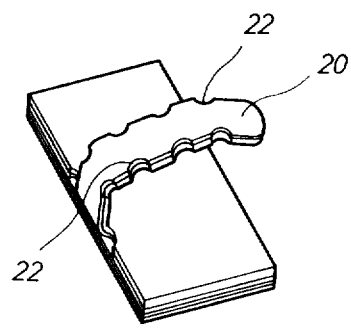
FIG. 4 is a perspective view of a second embodiment of the invention.

FIG. 4 shows a cable clamp as a second embodiment of the invention. In this embodiment, a pressure element 20 is provided with several constrictions 22. This constitution is favorable in that the pressure element 20 is bent readily at the constrictions 22 when it is to be pressed towards a clamp body 24 and deformed.

Figure 5:
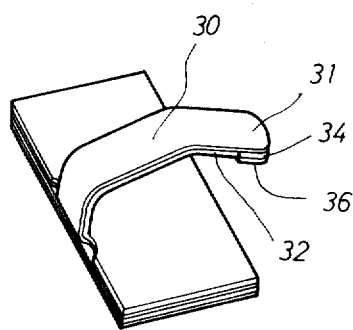
FIG. 5 is a perspective view of a third embodiment of the invention.
Figure 6:
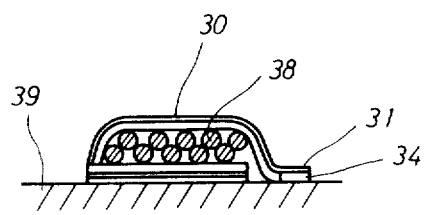
FIG. 6 is a sectional view illustrating a use state of the third embodiment.

FIG. 5 shows a cable clamp as a third embodiment of the invention. In this embodiment, a pressure element 30 is longer than that of the first embodiment and top end 31 of the pressure element 30 is provided with a cushion member 32, an adhesive layer 34 and a peeling layer 36. In order to fix cables 38, the peeling layer 36 at the top end is removed and the cables 38 are grasped by the pressure element 30 and then the top end 31 is pressed to a base 39. The top end 31 is adhered with the base 39 by means of the adhesive layer 34 thereby the cables 38 are fixed securely as shown in FIG. 6. In the clamp of this embodiment, there is no gap as shown in FIG. 2 between the top end 31 of the pressure plate 30 and the base 39 after the cables are fixed, therefore the cables 38 are not liable to be pulled out of the clamp.

FIG. 7 shows a cable clamp as a fourth embodiment of the invention. In this embodiment, a clamp body 40 is formed in a long configuration as an elongated quadralateral and two pressure elements 42 project upwards from short side surfaces at both ends of the clamp body 40. Constrictions 41 similar to those of the second embodiment are formed on root portions of the pressure elements 42. This embodiment is suitable for fixing cables particularly a flat-cable 44. As shown in FIG. 8, the flat-cable 44 is put onto a cushion member 45 of the clamp body 40 and the pressure elements 42 are bent towards the center thereby the flat-cable can be fixed readily.

Figure 10:
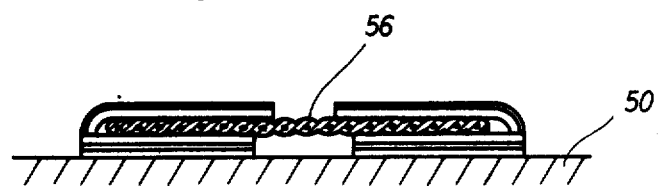
FIG. 10 is a sectional view illustrating a use state of the fifth embodiment.

FIG. 9 shows a cable clamp as a fifth embodiment of the invention. In this embodiment, a clamp body 50 is formed in a long configuration as an elongated quadralateral, and a plurality of pressure elements 52 project upwards from one long side surface in the longitudinal direction of the clamp body 50 and are bent in the lateral direction. A plurality of cable clamps in the first embodiment may be attached simultaneously to a base 54, therefore working can be effected rapidly in comparison to the case that a number of cable clamps must be attached to the base 50. Two cable clamps in this embodiment may be used in combination to fix a flat-cable 56 as shown in FIG. 10.

Figure 11:
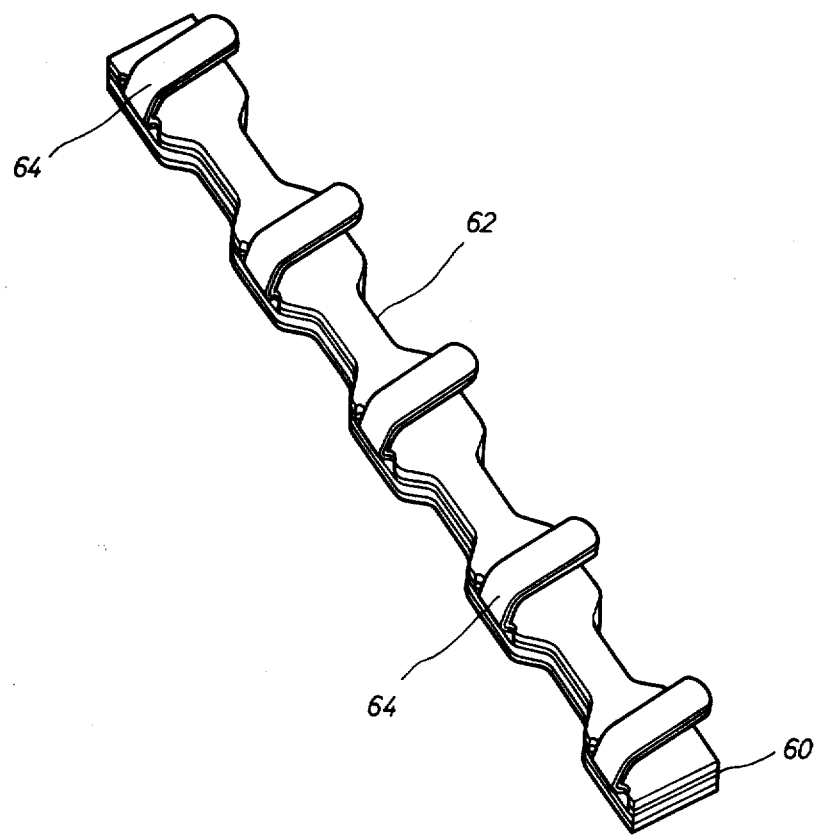
FIG. 11 is a perspective view of a sixth embodiment of the invention.

FIG. 11 shows a cable clamp as a sixth embodiment of the invention. In this embodiment, a clamp body 60 is formed in a long configuration similarly to the fifth embodiment but differs from the fifth embodiment in that large constrictions 62 are formed in several portions on the clamp body 60. Other constitutions are similar to those in the fifth embodiment. Since the constrictions 62 are formed on the clamp body 60 in this embodiment, when the cable clamp is used the clamp body 60 may be bent or cut using scissors at required portions of the constrictions 62 thereby a cable clamp having a required number of pressure elements 64 is obtained freely.

As above described, the present invention is in a cable clamp comprising a clamp body of flat plate shape provided with an adhesive layer and a peeling layer to cover the adhesive layer at the lower surface and with a cushion member applied to upper surface, and a pressure element projecting from the side surface of the clamp body and having a cushion member applied to the lower surface, wherein the clamp body and the pressure element are formed integrally by thin metal sheets.

Accordingly, a cable clamp of the present invention can fix cables readily and rapidly without damaging any cable cover. Moreover, it can fix any cable irrespective of thickness or shape.

What is claimed as new and desired to be secured by Letters Patent of the United States is:

1. A cable clamp comprising:
   a planar thin plastically deformable metal clamp body having an upper surface, a lower surface and at least one side edge;
   an adhesive layer covering said lower surface of said clamp body;
   a peeling layer covering said adhesive layer;
   thin plastically deformable metal pressure element, having one end integrally attached to, and projecting from, at least one said at least one side edge and having a lower surface facing said upper surface of said clamp body;
   at least one cushion member applied to said upper surface of said clamp body and said lower surface of each said pressure element; and
   a plurality of notches formed in said clamp body and extending from said one side edge, each of said notches being positioned adjacent said one end of said pressure element.

2. A cable clamp according to claim 1, wherein said at least one cushion member is formed from felt.

3. A cable clamp according to claim 1, wherein the clamp body and the pressure element are made of mild steel.

4. A cable clamp according to claim 1, wherein a plurality of constrictions are formed on several portions of said at least one pressure element.

5. The cable clamp of claim 1 wherein said at least one cushion member is formed from cloth.

6. The cable clamp of claim 1 wherein said at least one cushion member is formed from non-woven cloth.

7. The cable clamp of claim 1 wherein said at least one cushion member is formed of polyvinyl chloride foam.

8. The cable clamp of claim 1 wherein said at least one cushion member is formed of polyurethane foam.

9. The cable clamp of claim 1 wherein said clamp body and at least one pressure element are made of aluminum.

10. The cable clamp of claim 1 wherein said clamp body and at least one pressure element are made of brass.

11. The cable clamp of claim 1 wherein each said pressure element has a distal end opposite said one end, only said distal end of said pressure element including an adhesive layer and a peeling layer thereon.

12. The cable clamp of claim 1 wherein said clamp body is an elongated quadralateral having opposing long side edges and opposing short side edges, said at least one side edge comprising said short side edges and one of said at least one pressure elements projecting from each of said short side edges.

13. The cable clamp of claim 1 wherein said clamp body is an elongated quadralateral having opposing long side edges, said at least one side edge comprising one of said long edges, and a plurality of said pressure elements projecting from said one of said long edges.

14. The cable clamp of claim 13 wherein said clamp body is relatively narrowed in the direction transverse to said long side edges at portions between said pressure elements.

* * * * *